United States Patent [19]

Callant et al.

[11] Patent Number: 5,116,722
[45] Date of Patent: May 26, 1992

[54] SPECTRALLY SENSITIZED SILVER HALIDE EMULSIONS

[75] Inventors: Paul R. Callant, Edegem; Jean-Marie O. Dewanckele, Drongen, both of Belgium

[73] Assignee: Agfa-Gevaert, N.V., Mortsel, Belgium

[21] Appl. No.: 608,262

[22] Filed: Nov. 2, 1990

[30] Foreign Application Priority Data

Nov. 14, 1989 [EP] European Pat. Off. ............ 89202880

[51] Int. Cl.⁵ .................................................. G03C 1/26
[52] U.S. Cl. .................................... 430/363; 430/578; 430/591; 430/593
[58] Field of Search ............... 430/363, 578, 581, 593, 430/591

[56] References Cited

U.S. PATENT DOCUMENTS

2,493,748  1/1950  Brooker et al. ...................... 430/593
4,814,264  3/1989  Kishida et al. ...................... 430/581

*Primary Examiner*—Charles L. Bowers, Jr.
*Assistant Examiner*—Janet C. Baxter
*Attorney, Agent, or Firm*—Breiner & Breiner

[57] ABSTRACT

Method of forming a silver image by exposing a silver halide emulsion spectrally sensitized with a trinuclear merocyanine dye to light of 600-690 nm and wet-processing the emulsion with aqueous developing or activating solution and fixing solution, thereby dissolving away said dye from the resulting silver-image-containing material, said trinuclear merocyanine dye comprising at least 2 water-solubilizing groups.

6 Claims, No Drawings

SPECTRALLY SENSITIZED SILVER HALIDE EMULSIONS

FIELD OF THE INVENTION

The present invention relates to a method of forming silver images having a minimal residual colour stain in wet-processable photographic silver halide materials spectrally sensitized for the red wavelength range of from 600 to 690 nm.

BACKGROUND OF THE INVENTION

It is generally known to spectrally sensitize photographic silver halide emulsions so as to extend their sensitivity range. For instance, it is known to spectrally sensitize photographic silver halide emulsions with trinuclear cyanine dyes comprising a benzothiazole nucleus linked by a dimethine chain to a thiazolidone nucleus carrying a carboxymethyl group, which thiazolidone nucleus is linked directly to a second thiazolidone nucleus. An example of such dyes is the triethylamine salt of 3-carboxymethyl-5-[(3-ethyl-2-benzothiazolinylidene) -ethylidene]-2-(3-allyl-4-oxo-2-thio-5-thiazolidinylidene)-4-thiazolidone, which has been disclosed in SU-A 1,164,248.

Spectral sensitization for the red colour wavelength range is required to impact a desired red sensitivity to photographic silver halide emulsion materials for use in widely different application fields e.g. to photographic materials for camera exposure, positive photographic materials for contact papers or enlarging papers, photographic printing materials, and photographic materials for recording by means of light sources emitting in the red colour wavelength range such as e.g. diode light, laser light, and cathode ray tubes (CRT).

In recent years electronic colour separation scanners equipped with a laser light source have been used in many cases in the printing field. In particular a helium/neon laser having a power wavelength of 632.8 nm is often used, e.g. for the formation of dot images.

It is known to spectrally sensitize for this wavelength e.g. with the aid of sensitizing dyes described in U.S. Pat. No. 4,717,650.

Many of the dyes known for spectrally sensitizing photographic silver halide emulsions for the red wavelength range of 600 to 690 nm have the disadvantage of having a low solubility in water so that they usually have to be dispersed in the emulsions or added thereto in the form of an alcoholic solution. Consequently, they are not removed adequately during the processing. As a result, a considerable residual magenta to blue hue is left in the dried material. This considerable residual hue is disturbing in photographic materials and especially so in photographic materials comprising a white paper support.

There thus remains a need to find a method for forming silver images that are free or almost free of residual colour stain in wet-processable photographic silver halide materials, said materials having been spectrally sensitized with dyes that in addition to providing a desired spectral sensitivity range of from 600 to 690 nm and a satisfactory speed and gradation to the silver halide emulsion, are sufficiently soluble in water so that after development and fixing of the photo-exposed silver halide emulsion they are rinsed away for the greater part.

SUMMARY OF THE INVENTION

It is thus an object of the present invention to provide a method of forming a silver image by image-wise exposure and wet development of a photographic material comprising a silver halide emulsion that has been spectrally sensitized for the red wavelength range of 600 to 690 nm with dyes that after development, fixing, and rinsing of the photographic material leave a minimal residual colour stain therein.

Other objects will become apparent from the description hereinafter.

These objects are accomplished by a method of forming a silver image comprising image-wise exposing by means of a light source emitting light in the wavelength range of from 600 to 690 nm a photographic material comprising a light-sensitive silver halide emulsion incorporating at least one trinuclear merocyanine dye spectrally sensitizing said emulsion for said wavelength range or for a substantial part of said wavelength range, and wet-processing the exposed photographic material with aqueous developing or activating solutions and fixing solutions, thereby dissolving away said dye from the resulting silver-image-containing material, wherein said dye corresponds to one of the following general formulae I and II:

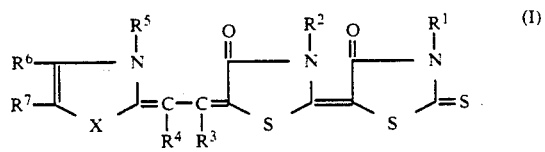

wherein:

X is —S— or —Se—, at least 2 members of $R^1$, $R^2$, $R^3$, and $R^4$—but $R^3$ and $R^4$ not together—stand for an organic radical carrying a water-solubilizing group in free acid form, in salt form, or in latent form, and are same or different, the members of $R^1$, $R^2$, $R^3$, and $R^4$ that do not represent a said organic radical carrying a water-solubilizing group standing for hydrogen, an alkyl group, a substituted alkyl group, an alkenyl group, a substituted alkenyl group, an aryl group, or a substituted aryl group, $R^5$ is an alkyl group, a substituted alkyl group, an alkenyl group, a substituted alkenyl group, an aryl group, or a substituted aryl group, and $R^6$ and $R^7$ (same or different) each represent hydrogen, hydroxy, a halogen atom, an alkyl group, a substituted alkyl group, an alkenyl group, a substituted alkenyl group, an alkoxy group, a substituted alkoxy group, an alkylthio group, a substituted alkylthio group, an arylthio group, a substituted arylthio group, an aryl group, a substituted aryl group, an acyl group, a substituted acyl group, an acyloxy group, a substituted acyloxy group, an alkoxycarbonyl group, a substituted alkoxycarbonyl group, an alkylsulphonyl group, a substituted alkylsulphonyl group, a carbamoyl group, a substituted carbamoyl group, a sulphamoyl group, a substituted sulphamoyl group, carboxy, or cyano, or $R^6$ and $R^7$ together represent the atoms necessary to complete an annellated carbocyclic ring system, which may bear one or more substituents, which may be same or different and are chosen from the above substituents given to $R^6$ and $R^7$ individually, and

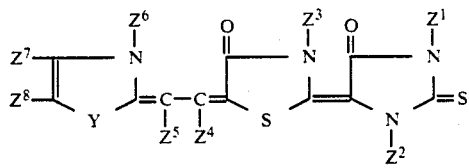

wherein:

Y is —S— or —Se—, at least 2 members of $Z^1$, $Z^2$, $Z^3$, $Z^4$, $Z^5$, and $Z^6$—but $Z^4$ and $Z^5$ not together—stand for an organic radical carrying a water-solubilizing group in free acid form, in salt form, or in latent form, and are same or different, the members of $Z^1$ and $Z^6$ that do not represent a said organic radical carrying a water-solubilizing group standing for hydrogen, an alkyl group, a substituted alkyl group, an alkenyl group, a substituted alkenyl group, an aryl group, or a substituted aryl group, and $Z^7$ and $Z^8$ (same or different) have a significance as defined for $R^6$ and $R^7$ of general formula 1.

DETAILED DESCRIPTION OF THE INVENTION

By "water-solubilizing group" as used herein is meant a group that—when at least two representatives (same or different) of such group as defined in the general formula are present in the dye molecule—renders the dye sufficiently soluble in water so that during development and fixing of the photo-exposed silver halide emulsion it is removed from the greater part and leaves a minimal residual colour stain in the material. A sufficient solubility in water is obtained when at least 0.5 g of dye dissolves in 1 l of water at room temperature and pH > 7. In case the water-solubilizing group(s) is (are) in latent form a sufficient solubility is obtained during the alkaline processing.

The substituents of the sensitizing dyes corresponding to the above general formulae are described more detailedly hereinafter.

The number of water-solubilizing groups in a sensitizing dye for use according to the present invention preferably is 2 or 3.

Thus, at least 2 of the members of $R^1$ to $R^4$ and at least 2 of the members of $Z^1$ to $Z^6$ stand for an organic radical carrying a water-solubilizing group. The at least 2 members of $R^1$ to $R^4$ and the at least 2 members of $Z^1$ to $Z^6$ that stand for such an organic radical carrying a water-solubilizing group are organic radicals e.g. an alkyl radical such as methyl or ethyl, said organic radicals carrying a said water-solubilizing group in free acid form, in salt form, or in latent form e.g. —$(CH_2)_n$—COOM, —$C_6H_4$—COOM, —$CH_2$—$C_6H_4$—COOM, —$(CH_2)_n$—$SO_3M$, —$C_6H_4$—$SO_3M$, —$CH_2$—$C_6H_4$—$SO_3M$, —$CH_2$—COO—$CH_2$—COO—$R^8$, —$CH_2$—COO—$CH_2$—CO—$R^8$, wherein n is a positive integer preferably of from 1 to 4, M is hydrogen, ammonium, an alkali metal atom e.g. sodium, potassium, and lithium, or an organic amine salt e.g. a triethylamine salt, ethyldiisopropylamine salt, pyridine salt, and diazabicyclo-undecene salt, and $R^8$ is an alkyl group e.g. methyl.

Examples of water-solubilizing groups in latent form are e.g. —$CH_2$—COO—$CH_2$—COO—$CH_3$ and —$CH_2$—COO—$CH_2$—CO—$CH_3$.

The members of $R^1$ to $R^4$ and the members of $Z^1$ to $Z^6$ that do not stand for an organic radical carrying a water-solubilizing group have a significance chosen from hydrogen, an alkyl group e.g. methyl and ethyl, a substituted alkyl group, an alkenyl group e.g. allyl, a substituted alkenyl group, an aryl group e.g. phenyl, or a substituted aryl group.

$R^5$ in general formula I is an alkyl group e.g. methyl, a substituted alkyl group, an aryl group e.g. phenyl, a substituted aryl group e.g. p-tolyl, an alkenyl group e.g. allyl, or a substituted alkenyl group.

$R^6$ and $R^7$ in general formula I and $Z^7$ and $Z^8$ in general formula II are same or different and each represent hydrogen, hydroxy, a halogen atom, an alkyl group e.g. methyl, ethyl, and propyl a substituted alkyl group e.g. trifluoromethyl and 2,2,2-trifluoroethyl, an alkenyl group e.g. allyl, a substituted alkenyl group, an alkoxy group e.g. methoxy and ethoxy, an alkylthio group e.g. ethylthio, a substituted alkylthio group, an arylthio group e.g. phenylthio, a substituted arylthio group, an aryl group e.g. phenyl, a substituted aryl group e.g. p-tolyl, an acyl group e.g. acetyl and propionyl, an acyloxy group e.g. acetoxy and propionyloxy, an alkoxycarbonyl group e.g. methoxycarbonyl and ethoxycarbonyl, an alkylsulphonyl group e.g. methylsulphonyl, a carbamoyl group, a substituted carbamoyl group, a sulphamoyl group, a substituted sulphamoyl group, carboxy, and cyano, or $R^6$ and $R^7$ together and $Z^7$ and $Z^8$ together represent the atoms necessary to complete an annellated carbocyclic ring system e.g. a benzene or naphthalene ring system, which may bear one or more substituents, which may be same or different and are chosen from the above substituents given to $R^6$ and $R^7$ and $Z^7$ and $Z^8$ individually.

Representatives of trinuclear merocyanine sensitizing dyes corresponding to one of the general formulae I and II, which dyes can be used in accordance with the present invention, are listed in the following Table 1. It is self-evident that this list is non-restrictive.

TABLE 1

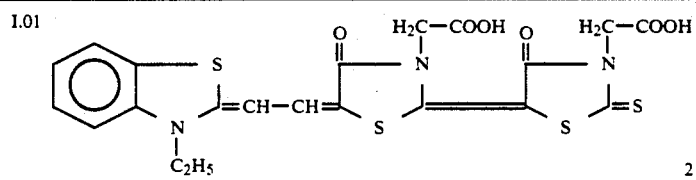

TABLE 1-continued
1.02 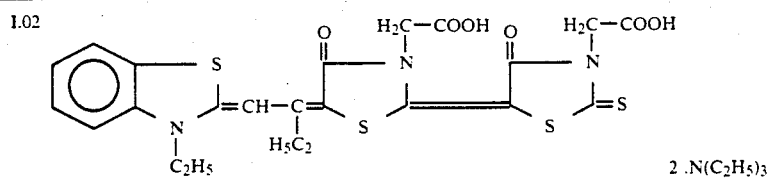
2 .N(C₂H₅)₃
1.03 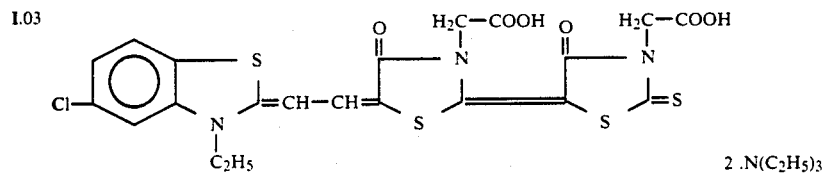
2 .N(C₂H₅)₃
1.04 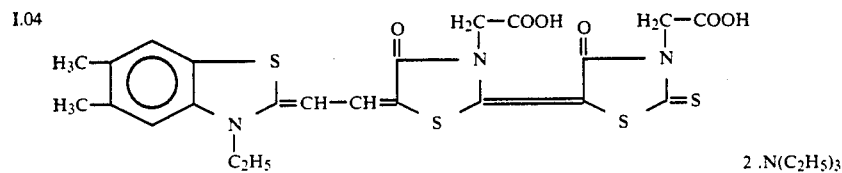
2 .N(C₂H₅)₃
1.05 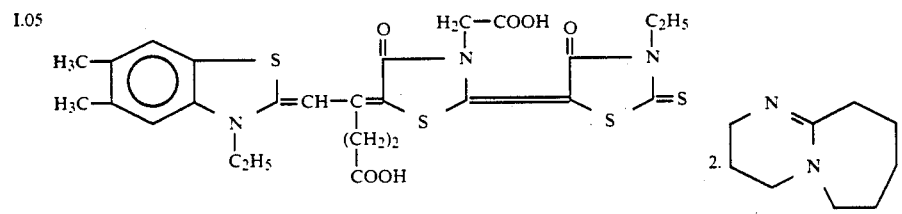
1.06 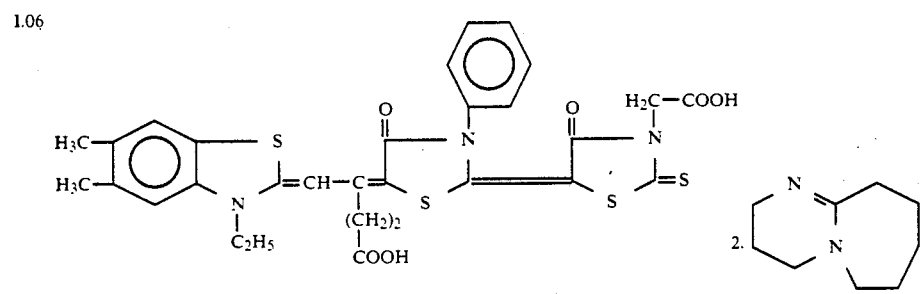
1.07 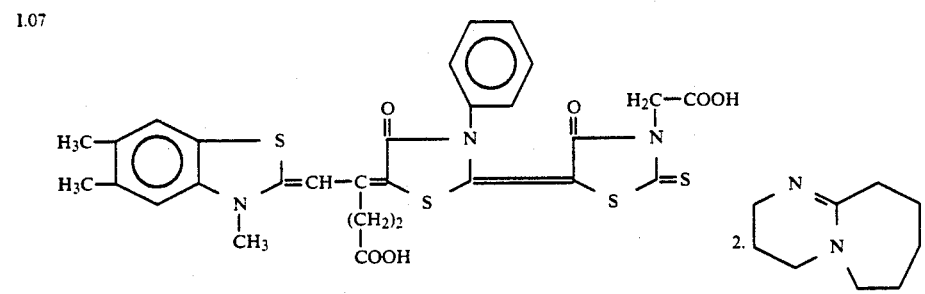
1.08 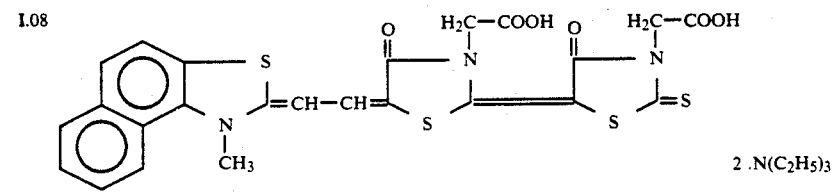
2 .N(C₂H₅)₃

TABLE 1-continued
1.09 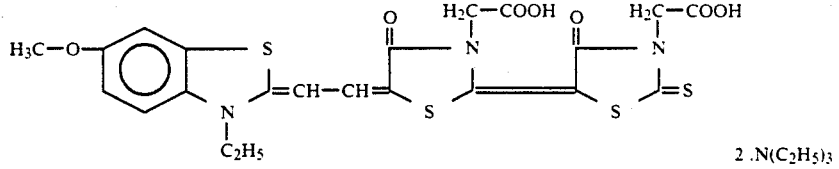
2 . N(C₂H₅)₃
1.10 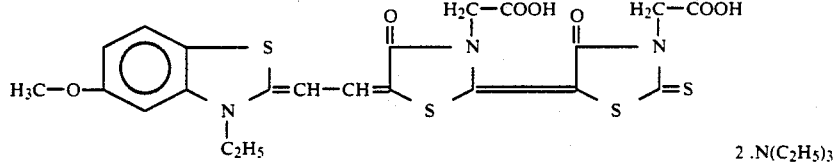
2 . N(C₂H₅)₃
1.11 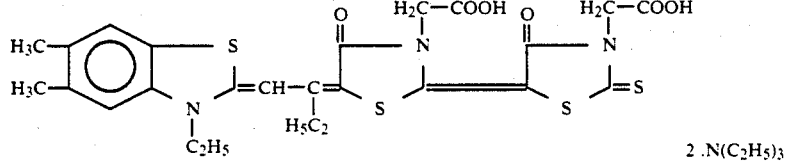
2 . N(C₂H₅)₃
1.12 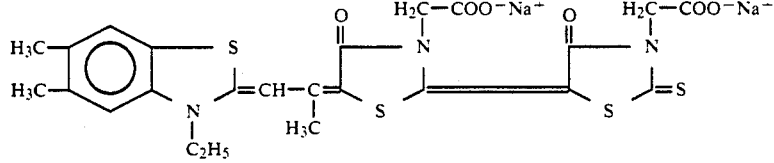
1.13 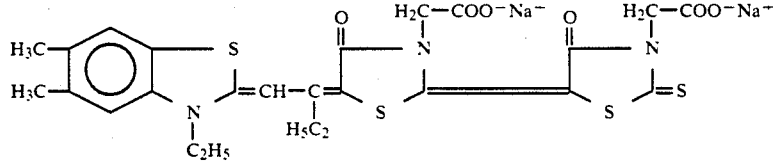
1.14 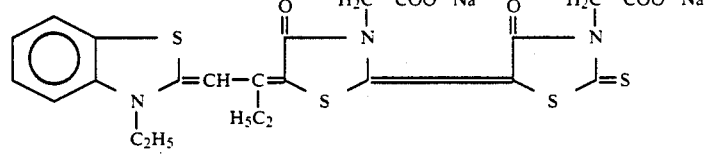
1.15 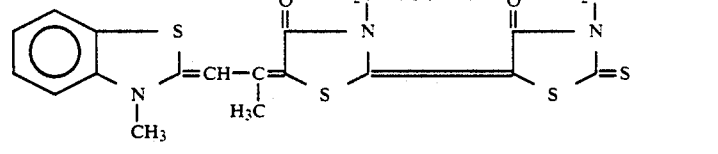
1.16 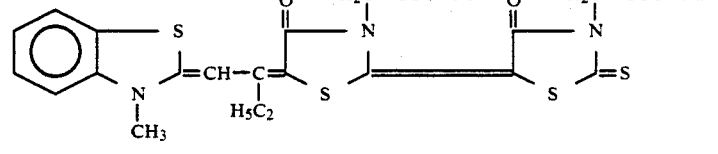
1.17 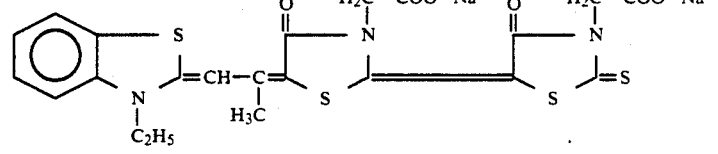

TABLE 1-continued
I.18 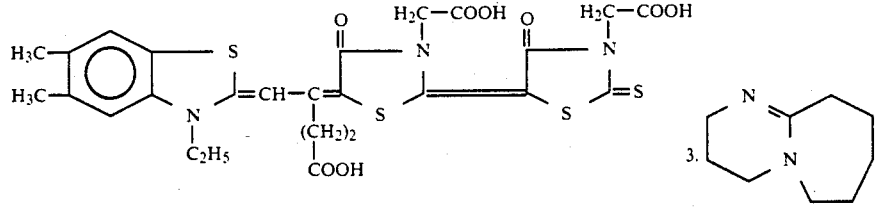
I.19 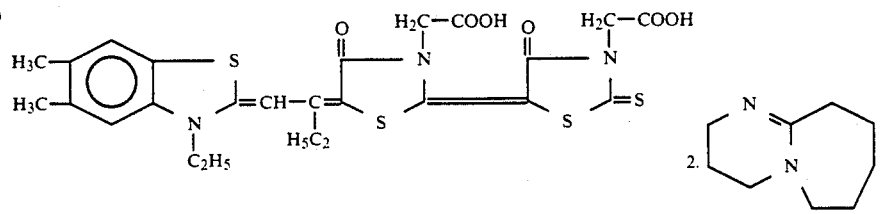
I.20 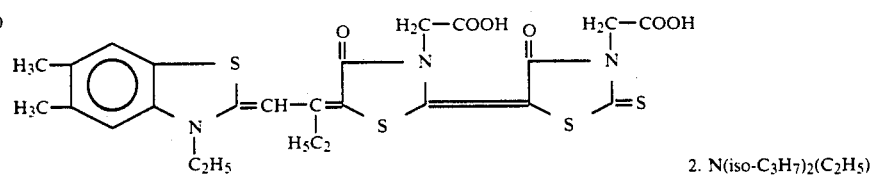
2. N(iso-C$_3$H$_7$)$_2$(C$_2$H$_5$)
I.21 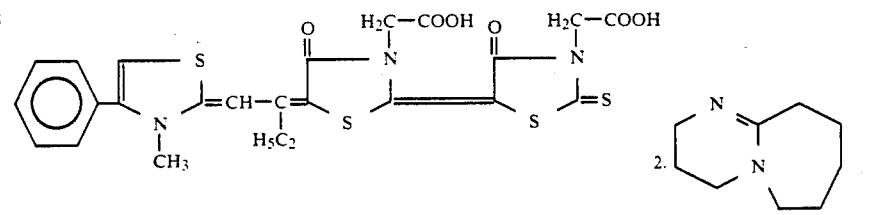
I.22 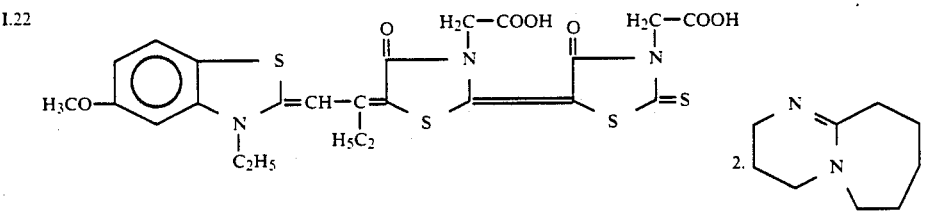
I.23 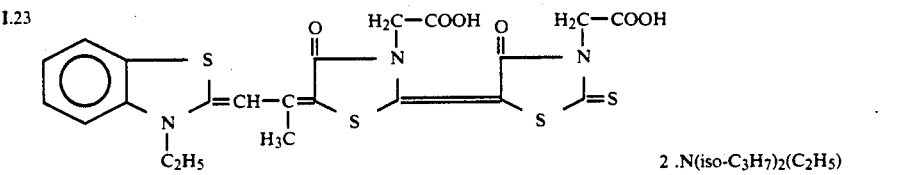
2. N(iso-C$_3$H$_7$)$_2$(C$_2$H$_5$)
I.24 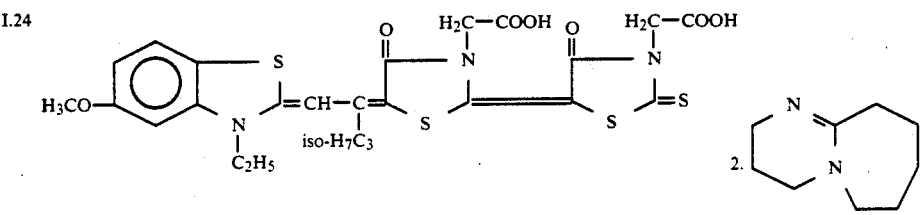

TABLE 1-continued

TABLE 1-continued
I.32 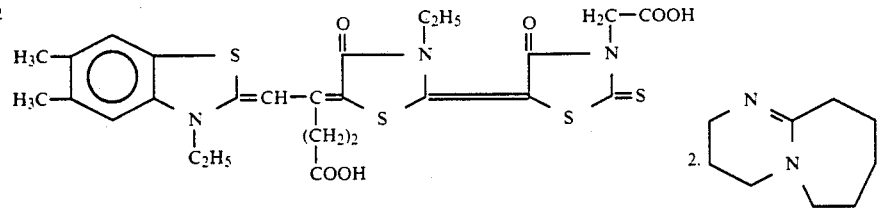
I.33 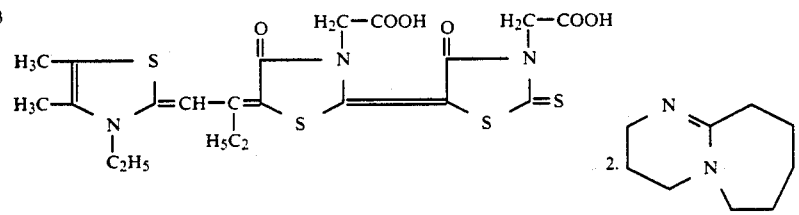
I.34 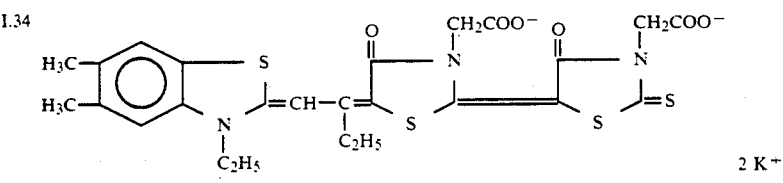
I.35 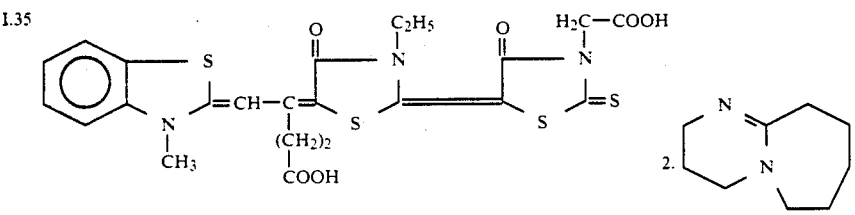
I.36 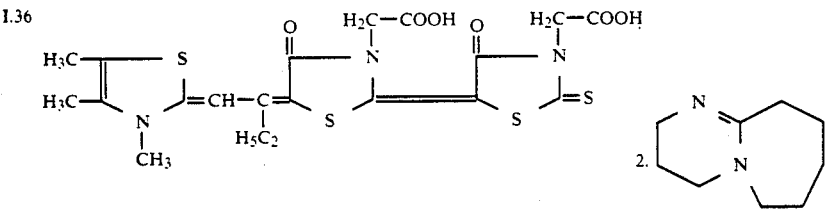
I.37 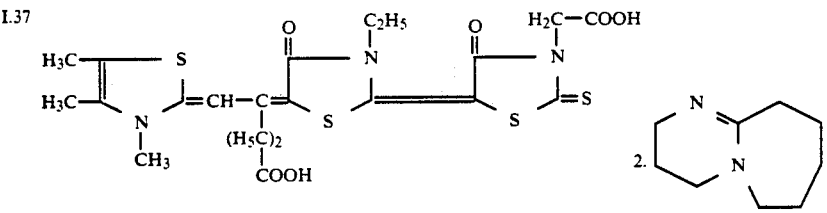
I.38 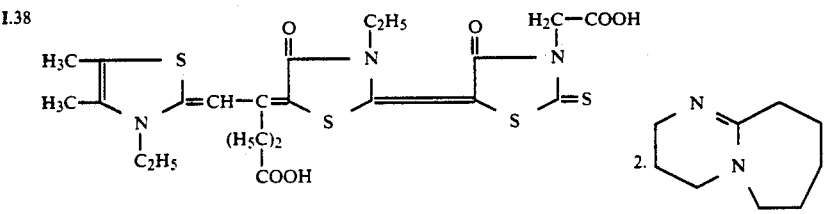

TABLE 1-continued
I.39 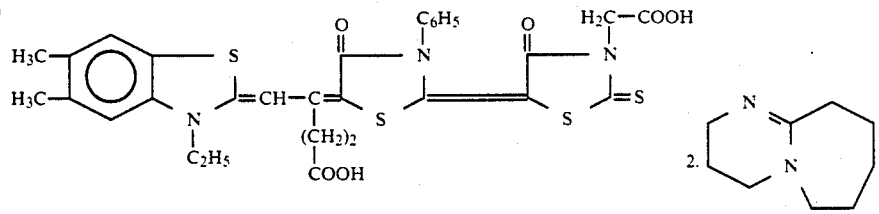
I.40 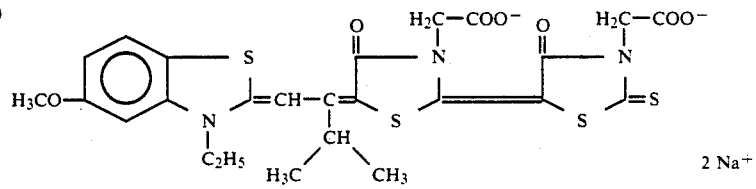
II.01 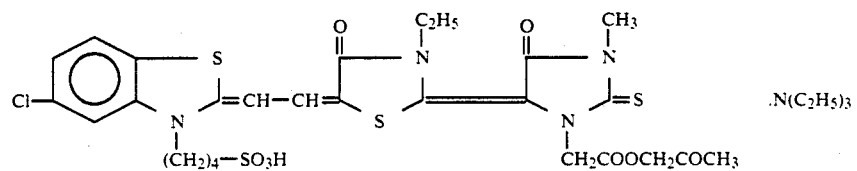
II.02 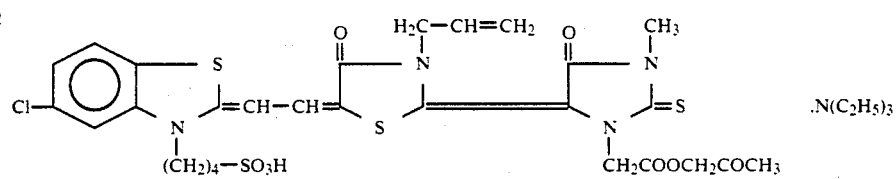
II.03 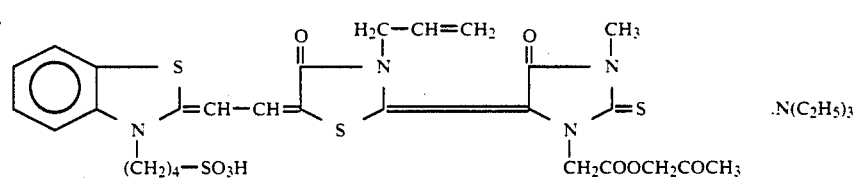
II.04 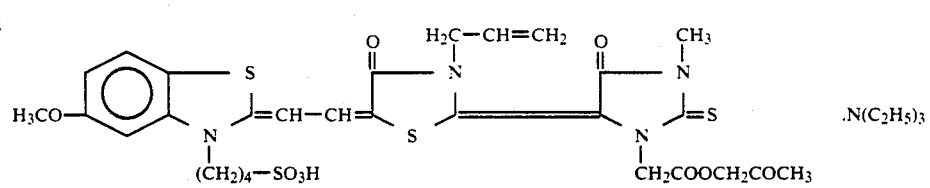
II.05 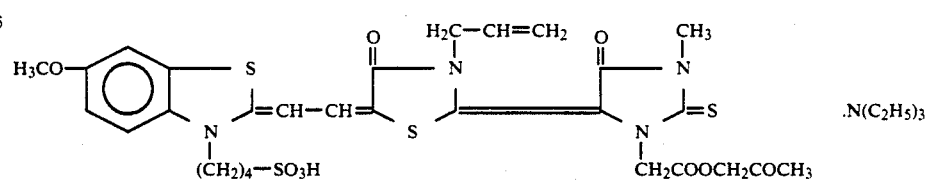
II.06 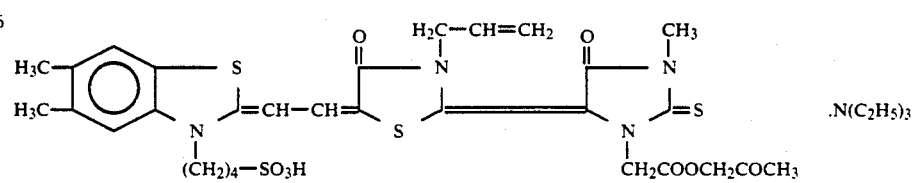

TABLE 1-continued
II.07 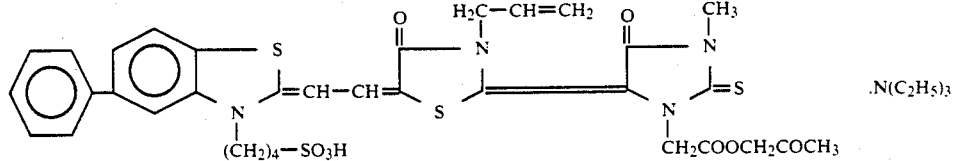
II.08 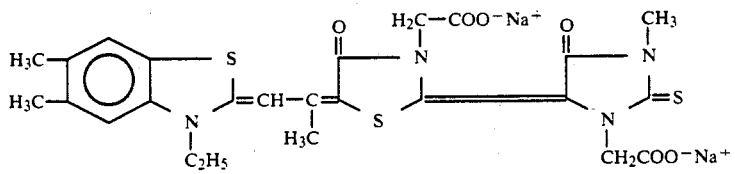
II.09 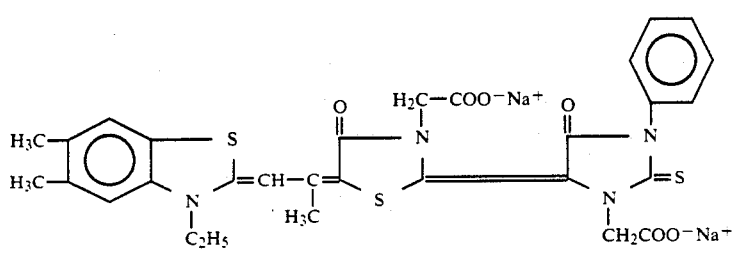
II.10 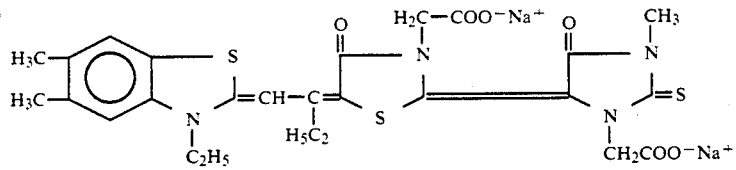
II.11 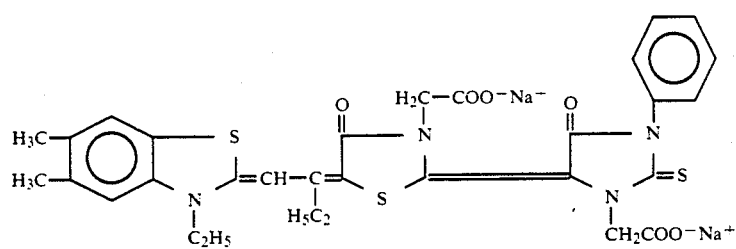
II.12 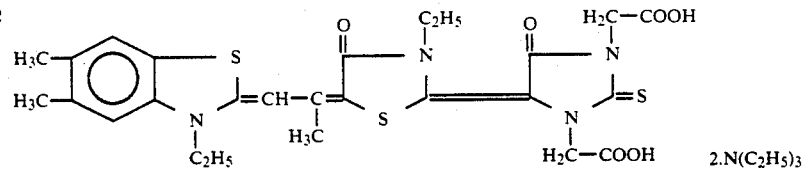
II.13 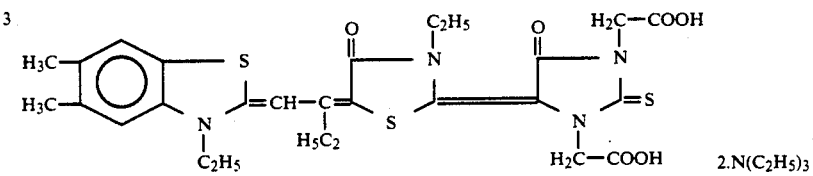
II.14 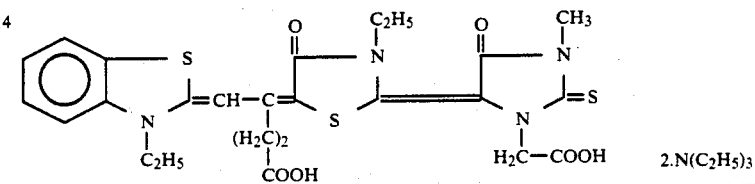
The trinuclear merocyanine dyes corresponding to the general formulae I and II can be synthesized accord- The following preparation examples illustrate the synthesis of dyes for use in accordance with the present invention. The synthesis of dye I.19 of Table 1 is represented in the following reaction scheme and is described in Preparation 1 hereinafter.

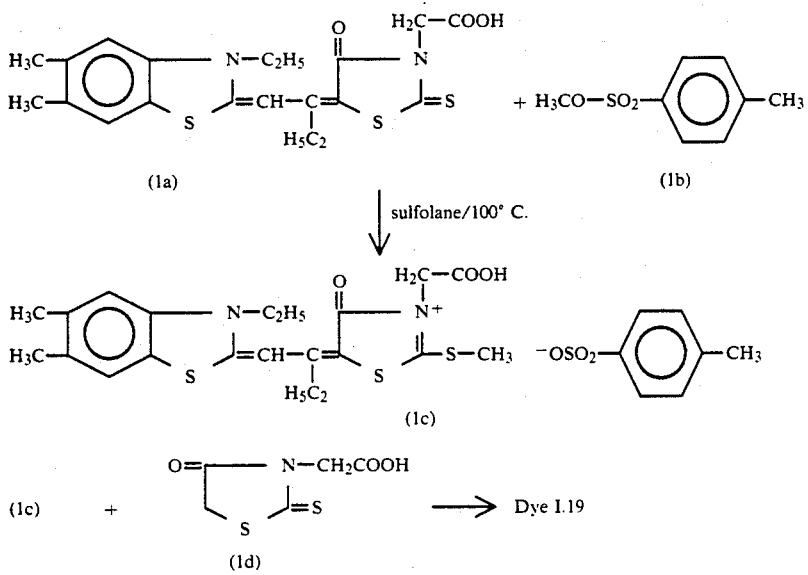

Preparation 1: Dye I.19 a) Compound (1a) can be prepared as described in the above-mentioned document by F. M. Hamer in the Chaptre dealing on "The Chemistry of heterocyclic compounds", pages 556-562.

b) An amount of 209 g of compound (1b) and 225 g of sulfolane are heated with stirring to 100° C. Slowly, 97.8 g of compound (1a) is added in 2 min to the mixture. The temperature of the reaction mixture is maintained at 95-100° C. for 6 h and then allowed to cool down to 50-60° C. A volume of 400 ml of acetone is added. The mixture is allowed to cool down to room temperature. The precipitate is filtered and rinsed thrice with 100 ml of acetone. The product is dissolved in a mixture of 400 ml of methylene chloride and 100 ml of methanol. The solution is filtered. Slowly, 500 ml of acetone is added with stirring in 2 min to the filtrate. The precipitate is dried under reduced pressure at 50-60° C. until constant weight.

Yield: 72 g of compound (1c).

c) A mixture is made of 240 ml of methylene chloride and 60 ml of methanol. A volume of 250 ml of the resulting mixture is added with stirring to 62.04 g of compound (1c). The suspension obtained is added to 22.94 g of compound (1d) with stirring. A solution of 61.6 ml of diazabicycloundecene in 50 ml of the above methylene chloride/methanol mixture is added in 2 min with slight cooling so that the temperature does not exceed 30° C. The reaction mixture is allowed to cool down to 26° C. A volume of 15.4 ml of diazabicycloundecene is added to the reaction mixture. After 20 min 500 ml of acetone is added with stirring. Crystallization takes place whilst slowly stirring on an icebath for 2 h. The precipitate is filtered and rinsed thrice with 100 ml of acetone. The precipitate is digested in 300 ml of acetone for 10 min and then filtered and rinsed again. A volume of 180 ml of methylene chloride, 120 ml of methanol, and 10.3 ml of diazabicycloundecene is addedto the precipitate. The resulting solution is filtered. A volume of 600 ml of acetone is added with stirring. Crystallization takes place whilst slowly stirring on an icebath for 3 to 4 h. The precipitate is filtered and rinsed thrice with 50 ml of acetone. The resulting dye is dried under reduced pressure at 50-60° C. until constant weight.

Yield: 38 g of dye I.19.

Other dyes for use in accordance with the present invention and corresponding to the general formulae I and II can be prepared analogously or by techniques known in the art.

The sensitizing dyes corresponding to the general formulae I and II are incorporated in photographic silver halide emulsions in an amount sufficient to spectrally sensitize them. For instance, the amount of sensitizing dye that is incorporated into the emulsion per mol of silver halide usually ranges from about $5 \times 10^{-7}$ mol to $5 \times 10^{-3}$ mol, preferably from about $5 \times 10^{-6}$ mol to $2 \times 10^{-3}$ mol, and even more preferably from about $1 \times 10^{-5}$ mol to $1 \times 10^{-3}$ mol. They are added in the form of an aqueous solution and blended with the silver halide emulsion, before the latter is coated on a suitable support. The sensitizing dyes may be added to the silver halide emulsion at any stage of the emulsion manufacturing.

The silver halide component of the photographic silver halide emulsion of the present invention may be silver chloride, silver bromide, silver iodide, silver chlorobromide, silver chloroiodide, silver bromoiodide, or silver chlorobromoiodide. Preferred silver halides are silver bromide, silver bromochloride, silver bromoiodide, and silver chlorobromoiodide.

The silver halide particles of the photographic emulsion of the present invention may have a regular crystalline form such as a cubic or octahedral form or they may have a transition form. They may also have an irregular crystalline form such as a spherical form or a tabular form, or may otherwise have a composite crystal form comprising a mixture of said regular and irregular crystalline forms. The emulsion may comprise a mixture of silver halide particles having various crystalline forms.

The silver halide of the photographic emulsion of the present invention may comprise tabular particles, at least 50% of the total projected area of which consists of particles having a thickness of 0.5 μm or less, preferably 0.3 μm or less, a diameter of at least 0.6 μm, and an average aspect ratio of at least 5. In addition, the silver halide emulsion of the present invention may be a mono-disperse emulsion in which at least 95% of the particles have a particle size falling within the scope of the average particle size ±40%. Preferred silver halide crystals have a surface of [1,0,0]. In particular, silver halide particles having crystals in which the surface area ratio of the surface [1,0,0] to the total surface area of the particles is at least 50%, especially at least 80%, are preferred in the present invention.

The silver halide particles to be used in the present invention may have different inner and outer surface crystal compositions or may have a uniform crystal composition. In addition, the silver halide particles may be of the type that is capable of forming a latent image mainly at the surface e.g. a negative type-emulsion, or alternatively of the type that is capable of forming a latent image mainly in the inner part of the particles e.g. an inner latent image-type emulsion or a previously fogged direct reversal emulsion.

The photographic silver halide emulsions used according to the present invention can be prepared by mixing the halide and silver solutions in partially or fully controlled conditions of temperature, concentrations, sequence of addition, and rates of addition. The silver halide can be precipitated according to the single-jet method, the double-jet method, or the conversion method.

The photographic emulsions to be used in the present invention may be prepared by various methods e.g. as described by P. Glafkides in "Chimie et Physique Photographique", Paul Montel, Paris (1967); by G. F. Duffin in "Photographic Emulsion Chemistry", The Focal Press, London (1966), and by V. L. Zelikman et al in "Making and Coating Photographic Emulsion", The Focal Press, London (1966). For instance, an acid method, a neutral method, or an ammonia method may be used.

A so-called reverse mixture method in which silver halide particles are formed in the presence of an excess silver ion may also be used. In addition, a so-called controlled-double-jet method, which is one type of a simultaneous mixture method, may also be used, where the pAg value in the liquid to form silver halide particles is kept constant. According to this method, an emulsion containing silver halide particles having a regular crystalline form and a uniform particle size may be obtained.

Two or more types of separately prepared silver halide emulsions may be mixed and used in the present invention.

In the formation of silver halide particles, a silver halide solvent may be used for the purpose of controlling the growth of the particles, such as ammonia, potassium thiocyanate, antimony thiocyanate, thioether compounds as described in e.g. U.S. Pat. Nos. 3,271,157, 3,574,628, 3,704,130, 4,276,374, and 4,297,439, thione compounds are described in e.g. JA-A (OPI) 144,319/78, 32,408/78, and 77,737/80, and amine compounds as described in e.g. JA-A (OPI) 100,717/79.

During any stage of the preparation of the silver halide particles or during the physical ripening thereof a cadmium salt, a zinc salt, a thallium salt, an iridium salt, or complex salts thereof, a rhodium salt or a complex salt thereof, or an iron salt or a complex salt thereof may be used as well.

Examples of internal latent image-type emulsions that can be used in the present invention include e.g. conversion-type emulsions, core/shell-type emulsions or hetero-metal-incorporated emulsions as described in e.g. U.S. Pat. Nos. 2,592,250, 3,206,313, 3,447,927, 3,761,276, and 3,935,014.

The light-sensitive silver halide emulsion can be a so-called primitive emulsion, in other words an emulsion that has not been chemically sensitized. However, the light-sensitive silver halide emulsion can be chemically sensitized as described i.a. in the above-mentioned "Chimie et Physique Photographique" by P. Glafkides, in the above-mentioned "Photographic Emulsion Chemistry" by G. F. Duffin, in the above-mentioned "Making and Coating Photographic Emulsion" by V. L. Zelikman et al, and in "Die Grundlagen der Photographischen Prozesse mit Silberhalogeniden" edited by H. Frieser and published by Akademische Verlagsgesellschaft (1968) pages 675-734. As described in said literature chemical sensitization can be carried out by effecting the ripening in the presence of small amounts of compounds containing sulphur e.g. thiosulphate, thiocyanate, thioureas, sulphites, mercapto compounds, and rhodanines. The emulsions can be sensitized also by means of gold-sulphur ripeners or by means of reductors e.g. tin compounds as described in GB-A 789,823, amines, hydrazine derivatives, formamidine-sulphinic acids, and silane compounds. Chemical sensitization can also be performed with small amounts of Ir, Rh, Ru, Pb, Cd, Hg, Tl, Pd, Pt, or Au. One of these chemical sensitization methods or a combination thereof can be used.

Sulfur-sensitization methods have been described in e.g. U.S. Pat. Nos. 1,574,944, 2,278,947, 2,410,689, 2,728,668, and 3,656,955. Reduction-sensitization methods have been described in e.g. U.S. Pat. Nos. 2,983,609, 2,419,974, and 4,054,458. Noble metal-sensitization methods have been described in e.g. U.S. Pat. Nos. 2,399,083 and 2,448,060 and in GB-A 618,061.

The photographic silver halide emulsions for use in accordance with the present invention may comprise compounds preventing the formation of fog or stabilizing the photographic characteristics during the production or storage of photographic elements or during the photographic treatment thereof. Many known compounds can be added as fog-inhibiting agent or stabilizer to the silver halide emulsion. Suitable examples are i.a. the heterocyclic nitrogen-containing compounds such as benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles (preferably 5-methylbenzotriazole), nitrobenzotriazoles, mercaptotetrazoles, in particular 1-phenyl-5-mercapto-tetrazole, mercaptopyrimidines, mercaptotriazines, benzothiazoline-2-thione, oxazoline-thione, triazaindenes, tetrazaindenes and pentazaindenes, especially those described by Birr in Z. Wiss. Phot. 47 (1952), pages 2-58, triazolopyrimidines such as those described in GB-A 1,203,757, GB-A 1,209,146, JA-Appl. 75-39537, and GB-A 1,500,278, and 7-hydroxy-s-triazolo-[1,5-a]-pyrimidines as described in U.S. Pat. No. 4,727,017, and other compounds such as benzenethiosulphonic acid, benzenethiosulphinic acid, benzenethiosulphonic acid amide. Other compounds that can be used as fog-inhibiting compounds are metal salts such as e.g. mercury or cadmium salts and the compounds described in Research Disclosure No. 17643 (1978), Chaptre VI.

The fog-inhibiting agents or stabilizers can be added to the silver halide emulsion prior to, during, or after the ripening thereof and mixtures of two or more of these compounds can be used.

Suitable additives for improving the dimensional stability of the photographic element are i.a. dispersions of a water-soluble or hardly soluble synthetic polymer e.g. polymers of alkyl (meth)acrylates, alkoxy(meth)acrylates, glycidyl (meth)acrylates, (meth)acrylamides, vinyl esters, acrylonitriles, olefins, and styrenes, or copolymers of the above with acrylic acids, methacrylic acids, Alpha-Beta-unsaturated dicarboxylic acids, hydroxyalkyl (meth)acrylates, sulphoalkyl (meth)acrylates, and styrene sulphonic acids. Polymer latices comprising a homo- or co-polymer of an alkyl acrylate, an alkyl methacrylate, acrylic acid and/or glycidyl acrylate have been described for that purpose in e.g. U.S. Pat. Nos. 3,411,911, 3,411,912, 3,142,568, 3,325,286, and 3,547,650 and JA-A 5331/70.

In case the silver halide emulsions of the present invention are used in a lith-type photographic material for printing, a polyalkylene oxide compound capable of increasing the infectious development effect of the material may be incorporated into the emulsions. For instance, compounds as described in e.g. U.S. Pat. Nos. 2,400,532, 3,294,537, and 3,294,540, FR-A 1,491.805 and 1,596,673, JA-A 23466/65, JA-A (OPI) 156,423/75, 18726/79, and 151,933/81 may be used for that purpose. Preferred examples include a condensation product of a polyalkylene oxide comprising at least 10 units of an alkylene oxide having from 2 to 4 carbon atoms such as ethylene oxide, propylene-1,2 oxide or butylene-1,2 oxide, and a compound having at least one active hydrogen atom such as water, an aliphatic alcohol, an aromatic alcohol, a fatty acid, an organic amine, or a hexitol derivative; and a block-copolymer comprising two or more polyalkylene oxides. Examples of the polyalkylene oxide compounds that are used preferably are polyalkylene glycol alkyl ethers, polyalkylene glycol aryl ethers, polyalkylene glycol alkyl aryl ethers, polyalkylene glycol esters, polyalkylene glycol fatty acid amides, polyalkylene glycol amines, polyalkylene glycol block copolymers, polyalkylene glycol graft polymers, etc. Polyalkylene oxide compounds that are used generally in the present invention are those having a molecular weight of from 300 to 15,000, and preferably from 600 to 8,000. The amount of polyalkylene oxide compound to be added to the emulsion is preferably from 10 mg to 3 g per mole of silver halide contained therein. The polyalkylene oxide compound may be added to the emulsion during whatever stage of its preparation.

The silver halide photographic emulsions of the present invention may comprise a colour coupler such as a cyan coupler, a magenta coupler, or a yellow coupler, and a compound capable of dispersing a colour coupler. For instance, a compound capable of colouring during colour development treatment by oxidation-coupling with an aromatic primary amine developing agent e.g. a phenylenediamine derivative or an aminophenol derivative may be incorporated into the silver halide emulsions. Examples of magenta couplers are 5-pyrazolone couplers, pyrazolo-benzimidazole couplers, cyanoacetylcoumarone couplers, and ring-opened acylacetonitrile couplers.

Examples of yellow couplers are arylacetamide couplers such as benzoylacetanilides and pivaloylacetanilides. Examples of cyan couplers are naphtol couplers and phenol couplers. Preferably, the couplers are non-diffusing and comprise a hydrophobic group of a so-called ballasting group in the molecule. Couplers may be either tetraequivalent or di-equivalent to the silver ion. In addition, coloured couplers having an activity for colour correction or couplers capable of releasing a development-inhibitor during development (so-called DIR couplers) may be used also according to the present invention.

In addition to DIR couplers, a non-colouring DIR-coupling compound capable of releasing a development-inhibitor, which, however, forms a colourless product during coupling-reaction, may also be used.

The silver halide photographic emulsions of the present invention may contain a water-soluble filter dye such as an oxonol dye, a hemioxonol dye or a merocyanine dye for the purpose of irradiation-prevention or for various other purposes.

The silver halide photographic emulsions of the present invention may contain a light-absorbing dye having the following structural formula:

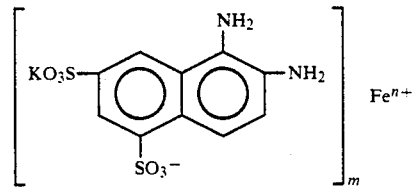

as screening dye to avoid light-scattering in the silver halide emulsion layers and thus to promote image sharpness. The same dye can also be used as antihalation dye in an antihalation layer to avoid reflection of light by the support towards the light-sensitive layers.

The photographic emulsions of the present invention may further contain various kinds of surface-active agents. Suitable surface-active agents include non-ionic agents such as saponins, alkylene oxides e.g. polyethylene glycol, polyethylene glycol/polypropylene glycol condensation products, polyethylene glycol alkyl ethers or polyethylene glycol alkylaryl ethers, polyethylene glycol esters, polyethylene glycol sorbitan esters, polyalkylene glycol alkylamines or alkylamides, silicone-polyethylene oxide adducts, glycidol derivatives, fatty acid esters of polyhydric alcohols and alkyl esters of saccharides; anionic agents comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as alkylamine, salts, aliphatic, aromatic, or heterocyclic quaternary ammonium salts, aliphatic or heterocyclic ring-containing phosphonium or sulphonium salts. Such surface-active agents can be used for various purposes e.g. as coating aids, as compounds preventing electric charges, as compounds improving slidability, as compounds facilitating dispersive emulsification, as compounds preventing or reducing adhesion, and as compounds improving the photographic characteristics e.g. higher contrast, sensitization, and development acceleration.

Development acceleration can be accomplished with the aid of various compounds, preferably polyalkylene derivatives having a molecular weight of at least 400, such as those described in e.g. U.S. Pat. Nos. 3,038,805, 4,038,075, and 4,292,400.

Compounds inhibiting colour deterioration of the colour image may be present in the silver halide emulsions of the present invention. Colour image-stabilizer may be used alone or mixtures of them may be used. Examples of known colour-deterioration inhibitors that can be used in the present invention are hydroquinone derivatives, gallic acid derivatives, p-alkoxyphenols, p-oxyphenol derivatives, and bisphenols.

The photographic silver halide emulsions of the present invention may contain an inorganic or organic hardener. For instance, hardeners of the epoxide type, hardeners of the ethyleneimine type, hardeners of the vinylsulfone type e.g. 1,3-vinylsulphonyl-2-propanol, chromium salts e.g. chromium acetate and chromium alum, aldehydes, e.g. formaldehyde, glyoxal, and glutaraldehyde, N-methylol compounds e.g. dimethylolurea and methyloldimethylhydantoin, dioxan derivatives e.g. 2,3-dihydroxy-dioxan, active vinyl compounds e.g. 1,3,5-triacryloyl-hexahydro-s-triazine, active halogen compounds e.g. 2,4-dichloro-6-hydroxy-s-triazine, and mucohalogenic acids e.g. mucochloric acid and mucophenoxychloric acid may be used. These hardeners can be used alone or in combination. The binders can also be hardened with fast-reacting hardeners such as carbamoylpyridinium salts.

Photographic materials to be prepared by using the photographic emulsions of the present invention may contain a colour-fog inhibitor such as a hydroquinone derivative, an aminophenol derivative, a gallic acid derivative, or an ascorbic acid derivative.

The silver halide photographic emulsions of the present invention may contain gelatin as a protective colloid or binder for the silver halide. Gelatin can, however, be replaced in part or integrally by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, dextrin, and alginates. In general, the semi-synthetic substitutes for gelatin are modified natural products e.g. gelatin derivatives obtained by conversion of gelatin with alkylating or acylating agents or by grafting of polymerizable monomers on gelatin, and cellulose derivatives such as hydroxyalkyl cellulose, carboxymethyl cellulose, phthaloyl cellulose, and cellulose sulphates.

The binder should dispose of an acceptable high number of functional groups, which by reaction with an appropriate hardening agent can provide a sufficiently resistant layer. Such functional groups are especially the amino groups, but also carboxylic groups, hydroxy groups, and active methylene groups.

The gelatin can be lime-treated or acid-treated gelatin. The preparation of such gelatin types has been described in e.g. "The Science and Technology of Gelatin", edited by A. G. Ward and A. Courts, Academic Press 1977, page 295 and next pages. The gelatin can also be an enzyme-treated gelatin as described in Bull. oc. Sci. Phot. Japan, No. 16, page 30 (1966).

The photographic element of the present invention may further comprise various other additives such as e.g. UV-absorbers, spacing agents, matting agents, a latex polymer, and plasticizers.

The finished emulsion of the present invention is coated on an appropriate support e.g. a baryta-coated paper, a resin-coated paper, a synthetic paper, a cellulose triacetate film, a polyethylene terephthalate film or on another plastic base or glass plate.

Exposure for formation of a photographic image may be carried out in a conventional manner with known light sources that match the sensitivity of the emulsions of the present invention. The exposure may be carried out with natural light (sunlight), an incandescent lamp, a halogen lamp, a fluorescent lamp, a mercury lamp, a xenon-arc lamp, a carbon-arc lamp, a xenon-flash lamp, a cathode-ray flying spot, etc. If desired, the spectral energy distribution of the light to be used for the exposure may appropriately be controlled with the aid of a colour filter. The photographic material may be exposed in a camera during a time lapse of from $1/1000$ s to 1 s or more, or during a shorter time e.g. by means of a xenon-flash lamp for of from $1/10^4$ to $1/10^6$ s, or during even shorter times of from $1/10^6$ to $1/10^8$ s e.g. by means of a laser. A laser ray may indeed be used for the exposure. Gas-lasers e.g. helium/neon lasers, dye-, or semiconductor lasers emitting light in the wavelength range to which the emulsion is sensitive can be used. Laser diodes or light-emitting diodes emitting in the wavelength range to which the emulsion is sensitive e.g. a red laser diode exposure device having a maximum intensity at 670 nm can be employed as well. A plasma light source is also a suitable light source for recording. The photographic material may also be exposed with light emitted by a fluorescent substance such as with light excited by an electronic ray, X-rays, Gamma-rays, or Alpha-rays. A bar-, line-, or strip-shaped light source or a planar light source as well as a microshatter arrangement with a fluorescing area (CRT, etc.), the fluorescence of which is produced by fluorescing substances stimulated by means of electron rays, or even a liquid-crystal display (LCD) or a lanthanum-doped lead-titanium zirconate (PLZT) can be used as well as exposure unit.

The spectral-sensitizing dyes of the present invention may be used for sensitization of silver halide photographic emulsions for various kinds of colour or black-and-white photographic materials. Various kinds of emulsions may be used therefor i.a. emulsions for colour positive film, emulsions for colour paper, emulsions for colour negative film, emulsions for colour reversal film (whether or not containing a coupler), emulsions for use in photomechanical processes such as for lith application or semilith such as described in U.S. Pat. Nos. 4,269,929 and 4,756,990, emulsions for phototype purposes, emulsions for a cathode-ray display photographic material, emulsions for use in a colloid transfer process e.g. as described in U.S. Pat. No. 2,716,059, emulsions for use in silver salt diffusion transfer reversal processes, emulsions for use in colour diffusion transfer processes, emulsions for use in imbibition transfer or wash-off processes such as described in e.g. U.S. Pat. No. 2,882,156, emulsions for use in a silver dye-bleaching method, emulsions for use in photographic material recording a print-out image e.g. as described in U.S. Pat. No. 2,369,449, emulsions for use in a direct print image-photographic material e.g. as described in U.S. Pat. No. 3,033,682, emulsions for microfilm, emulsions for holographic recording e.g. as described in GB-A 1,340,235, emulsions for use in heat-developing photographic material, and emulsions for use in a physical-developing photographic material e.g. as described in GB-A 920,277.

For the processing of the photographic materials according to the present invention any conventional means and any known processing solution e.g. as described in Research Disclosure No. 17643, Vol 176, December, 1978, pp. 28-30 may be employed. The processing may be of the type used for the formation of a silver image (black-and-white processing) or for the formation of a colour image (color processing) depending on the object and the use of the photographic materials to be processed. Currently, the processing temperature is chosen in the range of from 18 to 50° C., but it may be lower than 18° C. or higher than 50° C.

The invention is illustrated by means of the following examples.

the present invention, which have 2 water-solubilizing groups, were added in the form of a 0.4% aqueous solution. Equimolar amounts of sensitizing dye were used.

Next, 1.16 g of 4-hydroxy-6-methyl-1,3,3a,7-tetraazaindene and 7 ml of a 1.3% aqueous solution of sodium isotetradecyl sulphate were added in the given order per kg of emulsion. The emulsion obtained was coated on a polyester film support.

The sensitizing dye Comp. 1 used in the Comparison sample no. 1 corresponds to the following structural formula:

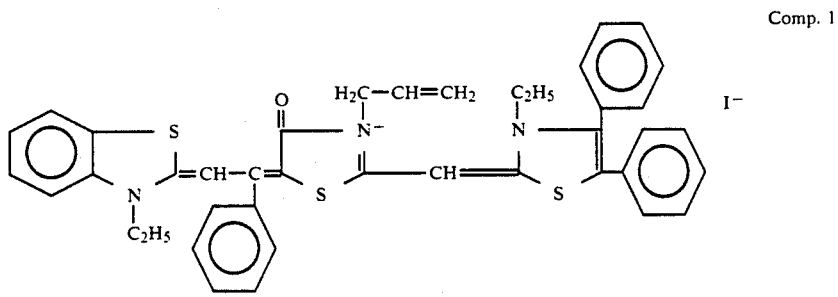

Comp. 1

The sensitizing dyes Comp. 2 and 3 used in the comparison samples no. 2 and 3 correspond to the following structural formulae:

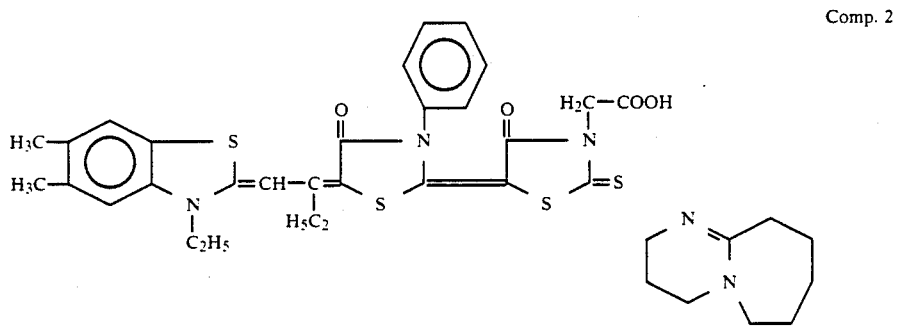

Comp. 2

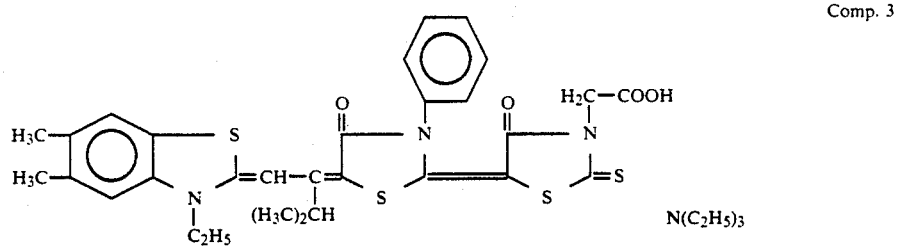

Comp. 3

EXAMPLE 1

A sulphur- and gold-sensitized silver halide emulsion comprising 83.6 mol % of silver chloride, 16 mol % of silver bromide and 0.4 mole % of silver iodide was prepared. The average grain diameter of the silver halide was 0.30 μm. One kg of emulsion contained 1.3 mol of silver halide.

A sensitizing dye as shown in Table II was added in an amount of $37 \times 10^{-5}$ mol per kg of silver halide emulsion, blended therewith, and stirred at 38° C. The sensitizing dyes Comp. 1 to 3 having no or but one water-solubilizing group had to be added in the form of a 0.2% methanolic solution. The sensitizing dyes according to Each of the samples obtained was exposed by means of a He-Ne laser image-setter CG 9600 with a mounted wedge, said image-setter being marketed by AGFA COMPUGRAPHIC, a division of AGFA CORPORATION, Wilmington, Mass. 011887, USA.

All exposed samples were developed for 30 s at 35° C. in a developer comprising 1 volume of Rapid Access G101C developer commercially available from AGFA-GEVAERT, Mortsel, Belgium, and 2 volumes of demineralized water. The developed samples were fixed, rinsed with water, and dried.

The density of each sample was then measured with a densitometer made by DAINIPPON SCREEN, Japan, to obtain a sensitometric curve. The standard point of the optical density for the determination of the sensitivity was taken at "fog+3.0". In the following Table 2 the results are given. The sensitivity values are relative values in respect of the sensitivity of the Comparison sample no. 1, to which the value 1.00 log I×t was given, "I" being the intensity of the exposure device and "t" being the exposure time. The higher the value, the higher the sensitivity.

TABLE 2

| Sample | Sensitizing dye | Relative sensitivity at 632 nm | Relative sensitivity at 670 nm | Fog. density × 100 | Residual colour |
|---|---|---|---|---|---|
| 1 | Comp.1 | 1.00 | 1.00 | 6 | deep blue |
| 2 | Comp.2 | 1.10 | 1.80 | 6 | blue/magenta |
| 3 | Comp.3 | 0.80 | 1.60 | 6 | deep blue |
| 4 | I.12 | 1.05 | 1.75 | 6 | light magenta |
| 5 | I.13 | 1.15 | 1.85 | 6 | light blue/ magenta |
| 6 | II.08 | 0.75 | 1.55 | 6 | none |
| 7 | II.11 | 0.80 | 1.60 | 6 | light blue |

The results listed in Table 2 show that:
the samples 4 to 7 containing sensitizing dyes according to the present invention have a sensitivity to light of a wavelength of 632 nm that is comparable with that of the Comparison samples 1 to 3,
the Comparison samples 2 and 3 and the samples 4 to 7 containing sensitizing dyes according to the present invention have a sensitivity to light having a wavelength of 670 nm that is much higher than that of the Comparison sample 1, and
the residual colour stain in the developed samples 4 to 7 according to the present invention is substantially lower than in the Comparison samples.

EXAMPLE 2

A sulphur-sensitized silver halide emulsion comprising 97.75% of silver chloride, 2% of silver bromide, and 0.25% of silver iodide was prepared. The average grain diameter of the silver halide was 0.28 μm. One kg of emulsion contained 0.7 mol of silver halide.

A sensitizing dye as shown in Table III was added in an amount of 37×10−5 mol per kg of silver halide emulsion, blended therewith, sand stirred at 40° C. The sensitizing dye Comp. 1 having the structural formula given in Example 1 was added in the form of a 0.1% methanolic solution, whereas the sensitizing dyes according to the present invention were added in the form of a 0.4% aqueous solution. Equimolar amounts of sensitizing dye were used.

Next, 50 mg of 1-phenyl-5-mercaptotetrazole, 20 g of hydroquinone, 3 g of 1-phenyl-pyrazolidin-3-on, and 20 ml of a 10% aqueous solution of saponin were added with stirring per kg of emulsion. The emulsion obtained was coated on a polyethylene-covered paper support.

Each of the thus obtained samples were exposed as described in Example 1 and then developed in an activator bath comprising 30 g of sodium hydroxide, 20 g of sodium sulphite, and 2 g of potassium bromide per liter of water. The developed samples were fixed, rinsed with water, and dried.

The density of each sample was then measured as described in Example 1. The standard point of the optical density for the determination of the sensitivity was taken at "fog+1.5". In the following Table 3 the results are given. The sensitivity values are relative values in respect of the sensitivity of Comparison sample no. 1 as defined in Example 1.

TABLE 3

| Sample | Sensitizing dye | Relative sensitivity at 632 nm | Fog. density × 100 | Residual colour |
|---|---|---|---|---|
| 1 | Comp.1 | 1.00 | 12 | deep blue |
| 2 | I.13 | 1.18 | 12 | light blue/ magenta |
| 3 | II.08 | 0.94 | 12 | light blue |

The results listed in Table 3 show that the residual colour stain in the developed samples 2 and 3 according to the present invention is substantially lower than that in the Comparison sample.

EXAMPLE 3

The same procedure as shown in example 1 was followed to evaluate the behaviour of the sensitizing dye in another chemical environment. Therefore, a silver halide emulsion with a high sensitivity for short-time exposure was prepared. This emulsion contained 98 mol % of silver bromide and 2 mol % of silver iodide. The average grain size was 0.24 μm. The sensitizing dyes Comp. 2 and 3 had the structural formulae given in Example 1.

After the exposure each sample was developed for 40 s at 38° C. in a Rapiline 66 Processor commercially available from AGFA-GEVAERT, Mortsel, Belgium, which had been filled with an alternative lith developer G700, also commercially available from AGFA-GEVAERT. The developed samples were fixed, rinsed with water, and dried.

The results measured are listed in Table 4.

TABLE 4

| Sample | Sensitizing dye | Relative sensitizing at 632 nm | Fog density × 100 | Residual colour |
|---|---|---|---|---|
| 1 | Comp.2 | 1.00 | 8 | deep purple |
| 2 | Comp.3 | 0.95 | 7 | deep blue |
| 3 | I.12 | 0.85 | 6 | light purple |
| 4 | I.13 | 1.00 | 6 | light blue |
| 5 | II.08 | 0.70 | 4 | very light blue |
| 6 | II.09 | 0.70 | 4 | very light blue |
| 7 | II.11 | 1.00 | 4 | light blue |

The results listed in Table 4 show that the residual colour stain in the developed samples 3 to 7 according to the present invention is substantially lower than that in the comparison samples.

EXAMPLE 4

A silver halide emulsion as described in Example 1 was sensitized with sensitizing dye I.13 as described in Example 1 and stabilized with 50 mg of 1-phenyl-5-mercaptotetrazole per kg of emulsion.

A photographic diffusion transfer reversal (DTR) monosheet material was then made as follows. A paper support weighing 135 g/m2 and coated on both sides with polyethylene was subjected to a corona discharge and then covered by the twin layer coating technique with an antihalation layer and a layer of the above silver halide emulsion, the emulsion being coated at a ratio of 1.5 g of silver per m2 (expressed as silver nitrate) and comprising 0.1 g of 1-phenyl-pyrazolidin-3-one and 1 g of gelatin per m2. The antihalation layer contained carbon black, silica particles having an average size of 5 μm, and gelatin coated at a ratio of 3 g/m2. The gelatin was lime-treated and substantially free from calcium ions (1,000 ppm or less) and was of the high viscosity-type (not less than 85 mPa.s at 40° C. for a 10% aqueous solution).

The dried monosheet material was subjected to a temperature of 40° C. for 5 days and then coated with an image-receiving layer containing palladium sulphide development nuclei, hydroquinone (0.4 g/m2), and formaldehyde (100 mg/m2).

The following processing solutions were prepared:

| Activator solution | |
|---|---|
| sodium hydroxide | 25 g |
| anhydrous sodium sulphite | 40 g |
| potassium thiocyanate | 20 g |
| 3-mercapto-4-acetamido-5-n-heptyl-1,2,4-triazole | 0.5 g |
| water to make | 1 l |
| Neutralization solution | |
| citric acid | 10 g |
| sodium citrate | 35 g |
| cystein | 1 g |
| anhydrous sodium sulphite | 5 g |
| phenol | 50 mg |
| water to make | 1 l |
| Dampening solution | |
| water | 880 ml |
| citric acid | 6 g |
| boric acid | 8.4 g |
| anhydrous sodium sulphate | 25 g |
| ethylene glycol | 100 g |
| colloidal silica | 28 g |

The above described DTR material was image-wise exposed in the image-setter described in Example 1, treated with the above-described activator solution for 10 s at 30° C., then treated with the above-described neutralization solution at 25° C., and dried.

The printing plate thus obtained was mounted on an AB DICK 350 CD offset printing machine marketed by AB DICK Co, Chicago, Ill. 60648, USA, and treated with the dampening solution.

The thus obtained printing plate was good in sensitivity and printing performance.

EXAMPLE 5

Samples of silver halide emulsion as described in Example 2 and comprising the sensitizing dye Comp. 1 and sensitizing dyes according to the present invention in the amounts as specified in Example 2 were prepared. Before coating of the emulsion samples, 50 mg of 1-phenyl-5-mercaptotetrazole and 20 ml of a 10% aqueous solution of saponin was added with stirring per kg of emulsion. The emulsion samples were coated on a polyethylene-covered paper support, exposed as described in Example 1, and developed for 30 s at 35° C. in a developer comprising 1 volume of the above-identified Rapid Access G101c developer and 2 volumes of demineralized water. The developed samples were fixed, rinsed with water, and dried.

The density of each sample was then measured as described in Example 2. The results are listed in the following Table 5.

TABLE 5

| Sample | Sensitizing dye | Relative sensitizing at 632 nm | Fog. density × 100 | Residual colour |
|---|---|---|---|---|
| 1 | Comp.1 | 1.00 | 12 | deep blue |
| 2 | I.13 | 1.18 | 12 | light blue/magenta |

TABLE 5-continued

| Sample | Sensitizing dye | Relative sensitizing at 632 nm | Fog. density × 100 | Residual colour |
|---|---|---|---|---|
| 3 | II.08 | 0.94 | 12 | light blue |

EXAMPLE 6

A sulphur- and gold-sensitized silver halide emulsion comprising 97.88 mol % of silver chloride, 1.80 mol % of silver bromide and 0.32 mol % of silver iodide was prepared. The average grain diameter of the silver halide was 0.24 μm. One kg of emulsion contained 0.96 mol of silver halide.

Equimolar amounts of sensitizing dyes as listed in Table 6 were added as described in Example 1.

Next, 1.16 g of 4-hydroxy-6-methyl-1,3,3a,7-tetraazaindene, 20 g of 3,3,3',3'-tetramethyl-5,6,5',6'-tetrahydroxy-spiro-bis-indane, and 20 g of n-propyl gallate as tanning developers and 7 ml of a 1.3% aqueous solution of sodium isotetradecyl sulphate were added in the given order per kg of emulsion. The emulsion samples obtained were coated on polyethylene-covered paper support.

Each of the thus obtained samples was exposed to a red laser diode exposure device having a maximum intensity of 670 nm.

Alternatively, the exposure could also be performed by means of a He-Ne laser exposure device L720 Plotter, commercially available from DISC, Nieuwevaart 153, 9000 Gent, Belgium.

After the exposure each sample was processed for 12 s at 18° C. in a bath comprising 1 volume of G200 activator, commercially available from AGFA-GEVAERT, Mortsel, Belgium, and 4 volumes of water. The developed samples were treated with a fixing bath. The unhardened gelatin in the non-image areas were washed away with hot water (40° C.).

The "density" of each sample was measured as described in Example 1 and the results listed in Table 6 are relative values as specified in Example 1.

TABLE 6

| Sample | Sensitizing dye | Relative sensitivity at 670 nm | Fog. density × 100 | Residual colour |
|---|---|---|---|---|
| 1 | Comp.1 | 1.00 | 6 | deep blue |
| 2 | Comp.2 | 1.75 | 6 | blue/magenta |
| 3 | Comp.3 | 1.60 | 6 | deep blue |
| 4 | I.12 | 1.75 | 6 | light magenta |
| 5 | I.13 | 1.85 | 6 | light blue/magenta |
| 6 | II.08 | 1.55 | 6 | none |
| 7 | II.11 | 1.65 | 6 | light blue |

The results listed in Table 6 show that the residual colour stain in the developed samples 4 to 7 according to the present invention is substantially lower than that in the Comparison samples and that the sensitivity is high.

We claim:

1. Method of forming a silver image comprising image-wise exposing by means of a light source emitting light in the wavelength range of from 600 to 690 nm a photographic material comprising a light-sensitive silver halide emulsion incorporating at least one trinuclear merocyanine dye spectrally sensitizing said emulsion for said wavelength range or for a substantial part of said wavelength range, and wet-processing the exposed photographic material with aqueous developing or activating solutions and fixing solutions, thereby dissolving away said dye from the resulting silver-image-containing material, wherein said dye corresponds to one of the following general formulae I and II:

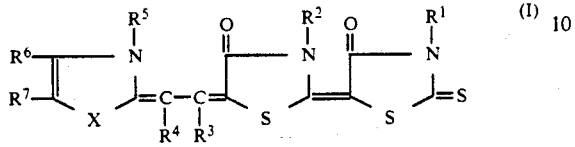

wherein:

X is —S— or —Se—, at least 2 members of $R^1$, $R^2$, $R^3$, and $R^4$—but $R^3$ and $R^4$ not together—stand for an organic radical carrying a water-solubilizing group in free acid form, in salt form, or in latent form, and are same or different, the members of $R^1$, $R^2$, $R^3$, and $R^4$ that do not represent a said organic radical carrying a water-solubilizing group standing for hydrogen, an alkyl group, an alkenyl group, or an aryl group, $R^5$ is an alkyl group, an alkenyl group, or an aryl group, and $R^6$ and $R^7$ (same or different) each represent hydrogen, hydroxy, a halogen atom, an alkyl group, an alkenyl group, an alkoxy group, an alkylthio group, an arylthio group, an aryl group, an acyl group, an acyloxy group, an alkoxycarbonyl group, an alkylsulphonyl group, a carbamoyl group, a sulphamoyl group, carboxy, or cyano, or $R^6$ and $R^7$ together represent the atoms necessary to complete an annellated carbocyclic ring system, which may bear one or more substituents, which may be same or different and are chosen from the above substituents given to $R^6$ and $R^7$ individually, and

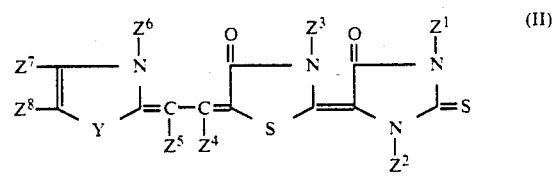

wherein:

Y is —S— or —Se—, at least 2 members of $Z^1$, $Z^2$, $Z^3$, $Z^4$, $Z^5$, and $Z^6$—but $Z^4$ and $Z^5$ not together—stand for an organic radical carrying a water-solubilizing group in free acid form, in salt form or in latent form, and are same or different, the members of $Z^1$ to $Z^6$ that do not represent a said organic radical carrying a water-solubilizing group standing for hydrogen, an alkyl group, an alkenyl group, or an aryl group, and $Z^7$ and $Z^8$ (same or different) have a significance as defined for $R^6$ and $R^7$ of general formula 1.

2. A method according to claim 1, wherein said organic radical carrying a water-solubilizing group is chosen from $-(CH_2)_n-COOM$, $-C_6H_4-COOM$, $-CH_2-C_6H_4-COOM$, $-(CH_2)_n-SO_3M$, $-C_6H_4-SO_3M$, $-CH_2-C_6H_4-SO_3M$, $-CH_2-COO-CH_2-COO-R^8$, and $-CH_2-COO-CH_2-CO-R^8$, wherein n is a positive integer of from 1 to 4, M is hydrogen, ammonium, an alkali metal atom, or an organic amine salt, and $R^8$ is an alkyl group.

3. A method according to claim 1, wherein said sensitizing dye is present in the emulsion in an amount of from about $5\times10^{-6}$ mol to $2\times10^{-3}$ mol per mol of silver halide.

4. A method according to claim 1, wherein said sensitizing dye is present in the emulsion in an amount of from about $1\times10^{-5}$ mol to $1\times10^{-3}$ mol per mol of silver halide.

5. A method according to claim 1, wherein said light-sensitive silver halide emulsion comprises silver halide particles having crystals in which the surface area ratio of the surface [1,0,0] to the total surface area of said particles is at least 80%.

6. A method according to claim 1, wherein said light source is a helium/neon laser or a red laser diode having a maximum intensity at 670 nm.

* * * * *

US005116722C1

(12) EX PARTE REEXAMINATION CERTIFICATE (5752nd)
United States Patent
Callant et al.

(10) Number: US 5,116,722 C1
(45) Certificate Issued: May 1, 2007

(54) SPECTRALLY SENSITIZED SILVER HALIDE EMULSIONS

(75) Inventors: Paul R. Callant, Edegem (BE);
Jean-Marie O. Dewanckele, Drongen (BE)

(73) Assignee: Agfa-Gevaert, Mortsel (BE)

Reexamination Request:
No. 90/005,782, Aug. 4, 2000
No. 90/006,293, May 6, 2002
No. 90/007,150, Aug. 2, 2004

Reexamination Certificate for:
Patent No.: 5,116,722
Issued: May 26, 1992
Appl. No.: 07/608,262
Filed: Nov. 2, 1990

(30) Foreign Application Priority Data

Nov. 14, 1989 (EP) .................................... 89202880

(51) Int. Cl.
*G03C 1/26* (2006.01)

(52) U.S. Cl. ....................... 430/363; 577/578; 577/591; 577/593

(58) Field of Classification Search ................. 430/363, 430/577, 578, 591, 593
See application file for complete search history.

(56) References Cited

U.S. PATENT DOCUMENTS

| | | | |
|---|---|---|---|
| 2,395,879 A | 3/1946 | Kendall et al. | |
| 2,493,748 A | 1/1950 | Brooker et al. | |
| 2,504,615 A | 4/1950 | Anish | |
| 2,575,018 A | 11/1951 | Keyes et al. | |
| 3,384,486 A | 5/1968 | Taber et al. | |
| 3,385,707 A | 5/1968 | Reister et al. | |
| 3,658,522 A | 4/1972 | Endo et al. | |
| 3,682,640 A | 8/1972 | Shiba et al. | |
| 3,912,507 A | 10/1975 | Keller et al. | |
| 4,323,643 A | 4/1982 | Mifune et al. | |
| 4,552,828 A | 11/1985 | Toya et al. | |
| 4,814,264 A | 3/1989 | Kishida et al. | |
| 4,897,343 A | 1/1990 | Ikeda et al. | |
| 4,945,036 A | * 7/1990 | Arai et al. .................. | 430/567 |
| 4,975,354 A | 12/1990 | Machonkin et al. | |

FOREIGN PATENT DOCUMENTS

| | | |
|---|---|---|
| DE | 704141 | 3/1941 |
| DE | 1925021 | 1/1970 |
| EP | 427892 B1 | 5/1981 |
| EP | 427892 A1 | 5/1989 |
| FR | 2058405 A5 | 5/1971 |
| FR | 2058405 | 5/1971 |
| GB | 489335 | 7/1938 |
| GB | 503478 | 4/1939 |
| GB | 666226 | 2/1952 |
| GB | 685390 | 1/1953 |
| JP | 63280243 | 11/1988 |
| JP | 63-280243 | 11/1988 |
| SU | 1164248 A1 | 6/1985 |
| SU | 1164248 | 6/1985 |

OTHER PUBLICATIONS

The Theory of The Photographic Process, Third Edition, T.H. James, 1966, pp. 198–230.*
Affirmation of Hans Zwicky (Oct. 28, 1996).
Affirmation of Rolf Hertli (Oct. 28, 1996).
Brooker, L.G.S., "Sensitizing and Desensitizing Dyes," The Theory of the Photographic Process, Chapter II, pp. 198–232.
Chemical Abstracts, vol. 101, No. 11, p. 631 (Sep. 10, 1984).
Experimental Report of Dr. Varescon, DuPont (Aug. 17, 1995).
Letter from Dr. Lonsky, Riedel–de Haen, to Dr. Moeller (Jan. 15, 1993).
Letter from Drs. Lonsky and Knaul, Riedel–de Haen, to Dr. Varescon (Sep. 12, 1988).
Letter from Drs. Schmand and Knaul, Riedel–de Haen, to Dr. Varescon (Jun. 22, 1989).
Letter from Drs. Wiese and Lonsky, Riedel–de Haen to Dr. G. Heimann (Feb. 17, 1993).
Meier, H., State Geochemical Research Institute Bamberg, Spectral Sensitization, Focal Press Ltd, GB, pp. 33, 51–52, 62–64 (1968).
Mehta et al., "Synthesis of 2,3–disubstituted–4–thiazolidinones and 3,5–diaminothiophere–2–carboxylic acid deritatives," Indian Journal of Chemistry, vol. 29B, No. 12, pp. 1146–1153 (Dec. 1990).
Mohareb et al., "One–Pot Synthesis of Polyfunctionally Substituted 2–,3–Dihydrothiazoles and Thiazolidinones," Liebigs Ann. Chem., vol. 11, pp. 1143–1146 (1990).
Neumuller, O., Rompp's Chemie Lexikon, vol. 4, $8^{th}$ Ed., Stuttgart, pp. 3185–3190 (1985).
Riedel–de Haen AG, Fotofarbatoffe/Photo dyes Colorants Photographiques/Colorantes forograficos, PINA® Brochure (1989).
Summary description of Red Sensitized W329 TB by Drs. Bartels and Lonsky, Riedel–de Haen (Oct. 21, 1996).
Typon, TS–HN graphic arts film product description (Jan. 23, 1987).
Typon, Typoscan TS–HN advertisement (1987).
Zwicky, H., Introduction to the Technology of Photographic Silver Halide Layers, Burgdorf, pp. 45, 115–132, 221 (1979).
H. Meier, State Geochemical Research Institute, Bamberg, *Spectral Sensitization,* Focal Press Limited, GB, 1968, pp. 33, 51, 52, 62, 63 and 64, Translation from German.
H. Zwicky, "Introduction to the technology of photographic silver halide layers", Burgdorf, 1979 pp. 45, 115–132 and 221, w/Translation from German, 20 pages.

(Continued)

*Primary Examiner*—Thorl Chea

(57) ABSTRACT

Method of forming a silver image by exposing a silver halide emulsion spectrally sensitized with a trinuclear merocyanine dye to light of 600–690 nm and wet-processing the emulsion with aqueous developing or activating solution and fixing solution, thereby dissolving away said dye from the resulting silver-image-containing material, said trinuclear merocyanine dye comprising at least 2 water-solubilizing groups.

OTHER PUBLICATIONS

O. Neumüller, *Rompp's Chemie Lexikon,* vol. 4, 8th Ed., Stuttgart, 1985, pp. 3185–3190, w/Translation from German, 16 pages.

Riedel–de Haën AG, "Fotofarbstoffe/Photo dyes Colorants photographiques/Colorantes fotográficos", PINA® Brochure, 1989, 18 pages, German/English translation.

Feb. 17, 1993 letter to Dr. G. Heimann, DuPont from Drs. Wiese and Lonsky, Riedel–de Haën.

Jun. 22, 1989 letter to Dr. Varescon, DuPont from Drs. Schmand and Knaul, Riedel–de Haën.

Sep. 12, 1988 letter to Dr. Varescon, DuPont from Drs. Lonsky and Knaul, Riedel–de Haën.

Jan. 15, 1993 letter to Dr. Möeller, DuPont from Dr. Lonsky, Riedel–de Haën.

Aug. 17, 1995 Experimental Report of Dr. Varescon, DuPont.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

* * * * *